United States Patent
Manawadu et al.

(10) Patent No.: US 11,628,789 B2
(45) Date of Patent: Apr. 18, 2023

(54) OCCUPANT POSITION DETECTION SYSTEM

(71) Applicants: Toyota Jidosha Kabushiki Kaisha, Toyota Aichi-ken (JP); Aisin Seiki Kabushiki Kaisha, Kariya (JP)

(72) Inventors: Udara Manawadu, Tokyo (JP); Yoshihiro Saeki, Tokyo (JP)

(73) Assignees: TOYOTA JIDOSHA KABUSHIKI KAISHA, Toyota Aichi-ken (JP); AISIN SEIKI KABUSHIKI KAISHA, Kariya Aichi-ken (JP)

( * ) Notice: Subject to any disclaimer, the term of this patent is extended or adjusted under 35 U.S.C. 154(b) by 211 days.

(21) Appl. No.: 16/834,154

(22) Filed: Mar. 30, 2020

(65) Prior Publication Data

US 2021/0300274 A1   Sep. 30, 2021

(51) Int. Cl.
  *B60R 21/015*   (2006.01)
  *B60R 21/16*   (2006.01)

(52) U.S. Cl.
  CPC .. *B60R 21/01538* (2014.10); *B60R 21/01552* (2014.10); *B60R 21/16* (2013.01); *B60R 21/01516* (2014.10); *B60R 2021/161* (2013.01)

(58) Field of Classification Search
  None
  See application file for complete search history.

(56) References Cited

U.S. PATENT DOCUMENTS

| | | | |
|---|---|---|---|
| 7,526,120 B2 | 4/2009 | Gokturk et al. | |
| 9,604,587 B2 | 3/2017 | Togura et al. | |
| 2003/0209893 A1* | 11/2003 | Breed | B60R 21/01536 701/45 |
| 2006/0004504 A1 | 1/2006 | Bouladian | |
| 2016/0266186 A1* | 9/2016 | Mansour | H04B 17/354 |
| 2018/0147955 A1 | 5/2018 | Fujii et al. | |
| 2018/0150707 A1* | 5/2018 | Fujii | G06T 7/60 |
| 2019/0118849 A1 | 4/2019 | Cazzoli | |
| 2019/0375312 A1* | 12/2019 | Petersson | B60R 21/0153 |

FOREIGN PATENT DOCUMENTS

| | | | |
|---|---|---|---|
| JP | 2005-053389 A | 3/2005 | |
| JP | 2018-083589 A | 5/2018 | |
| JP | 2018083561 A | 5/2018 | |
| WO | WO-2020165908 A2 * | 8/2020 | G06K 9/4628 |
| WO | WO-2021156914 A1 * | 8/2021 | |

OTHER PUBLICATIONS

Machine translation of WO2021/156914A1 (Year: 2022).*

* cited by examiner

*Primary Examiner* — Aniss Chad
*Assistant Examiner* — Jennifer M Anda
(74) *Attorney, Agent, or Firm* — Dinsmore & Shohl LLP

(57) ABSTRACT

An occupant position detection system includes an imaging device configured to capture an image of an occupant seated on a seat provided in an interior of a vehicle, a sensor provided on the seat, a first calculating unit configured to calculate a first position of the occupant from the image captured by the imaging device, a second calculating unit configured to calculate a second position of the occupant from a detection result of the sensor, an occupant position calculating unit configured to calculate an occupant position by fusing the first position and the second position, and an output unit configured to output information on the occupant position calculated by the occupant position calculating unit, to a safety device.

5 Claims, 12 Drawing Sheets

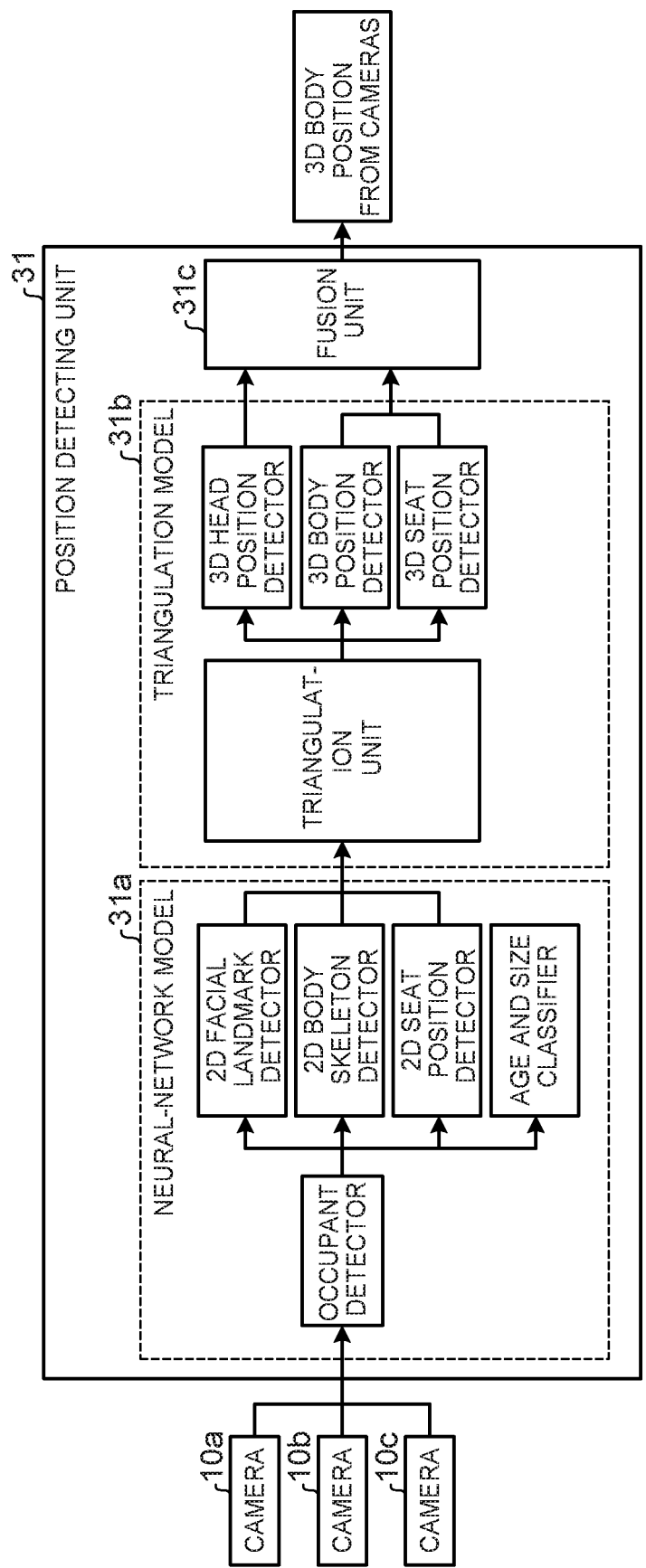

OCCUPANT POSITION DETECTION SYSTEM

BACKGROUND

1. Technical Field

The disclosure relates to an occupant position detection system that can detect a position of an occupant with high accuracy.

2. Description of Related Art

As one example of the related art of the disclosure, a technology of detecting information of an occupant seated on a vehicle seat, and using the detected information for airbag deployment control is known. For example, in an occupant information detection system described in Japanese Unexamined Patent Application Publication No. 2018-083561 (JP 2018-083561 A), information concerning the build or body type of an occupant is computed, based on information on a face position and a face inclination obtained from a captured image of the occupant, and detection values of load sensors provided on a seat.

SUMMARY

When a controller of a vehicle deploys an airbag, the controller needs to detect a head position of the occupant with high accuracy. This is because it is important to protect the head of the occupant, in particular, when the occupant is protected by the airbag. While the information concerning the build of the occupant is obtained in the system of JP 2018-083561 A, the system is not configured to detect the head position of the occupant, by using the image and the detection values of the load sensors.

The disclosure provides an occupant position detection system that can detect a position of an occupant with high accuracy.

An occupant position detection system according to a first aspect of the disclosure has an imaging device configured to capture an image of an occupant seated on a seat provided in an interior of a vehicle, a sensor provided on the seat, a first calculating unit configured to calculate a first position of the occupant from the image captured by the imaging device, a second calculating unit configured to calculate a second position of the occupant from a detection result of the sensor, an occupant position calculating unit configured to calculate an occupant position by fusing the first position and the second position, and an output unit configured to output information on the occupant position calculated by the occupant position calculating unit, to a safety device.

In the first aspect of the disclosure, the occupant position calculating unit may be configured to calculate a position by fusing the first position and the second position, by linear combination using the minimum means square error method, and calculate the occupant position by applying the Kalman filter to a result of calculation.

In the first aspect of the disclosure, the first calculating unit may include a neural network that receives the image captured by the imaging device, a triangulation model that receives facial landmarks and a body skeleton of the occupant, and a seat position, from the neural network, and a fusion unit that fuses a head position, a body position, and the seat position generated from the triangulation model, so as to output the first position.

In the first aspect of the disclosure, the second calculating unit may include a knowledge-based expert system that receives the detection result of the sensor, calculates a torso/body posture in two dimensions, and calculates a seat position in three dimensions. The second calculating unit may be configured to output the second position based on the results of calculations.

In the first aspect of the disclosure, the safety device may be an airbag for front collision, an airbag for rear collision, a side impact airbag, a seat mounted airbag, a head rest, a retractor, a seat recliner, or an informing unit configured to provide guidance by voice or visually.

According to the first aspect of the disclosure, the position of the occupant can be detected with high accuracy.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a functional block diagram showing the configuration of a position detecting unit that detects a position based on images of cameras shown in FIG. 1:

DETAILED DESCRIPTION OF EMBODIMENTS

Figure 1:
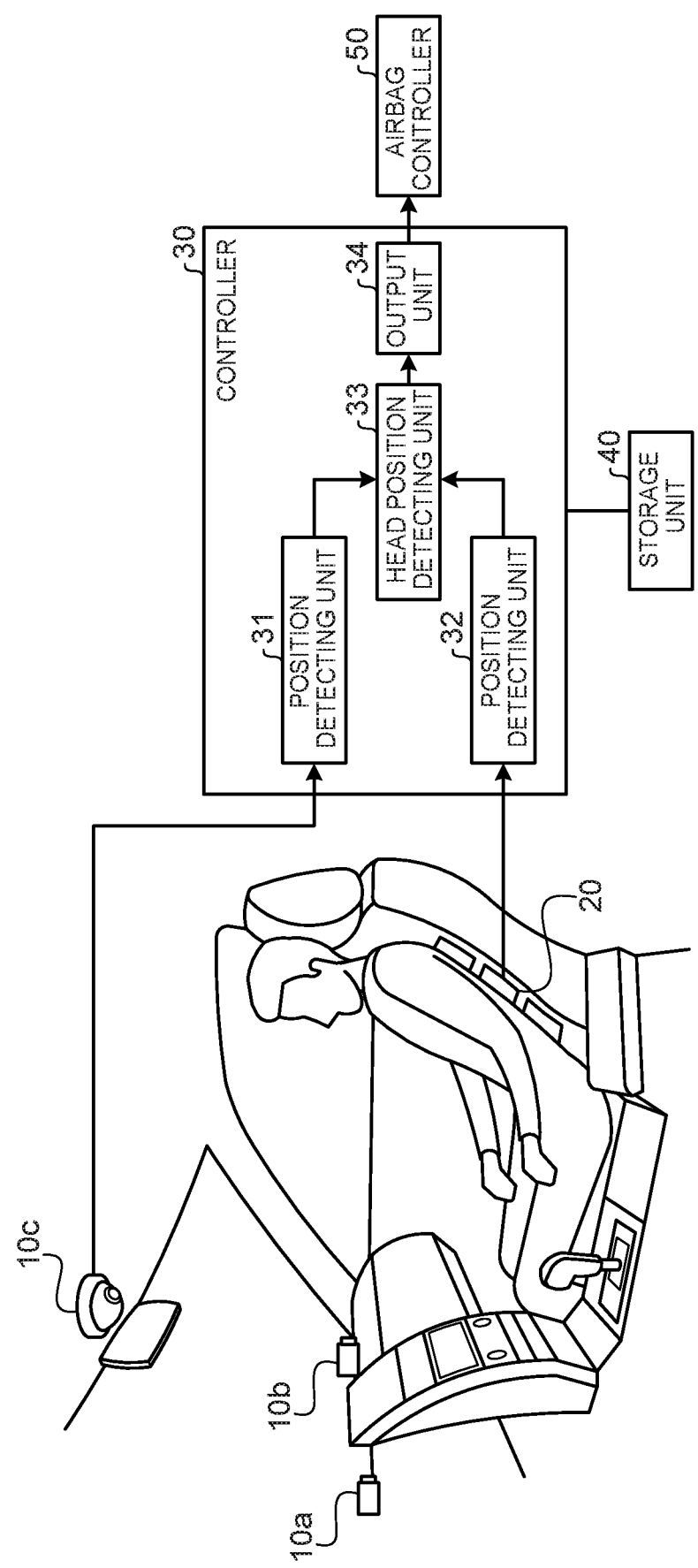
FIG. 1 is a view useful for describing the configuration of an occupant position detection system according to one embodiment.

Referring to the drawings, an occupant position detection system according to one embodiment of the disclosure will be described. In this embodiment, the case where the position of the head of an occupant is obtained will be mainly described.

Brief Description of Occupant Position Detection System

The occupant position detection system according to this embodiment will be briefly described. An airbag installed on a vehicle is a safety device that can save life of an occupant when a serious collision takes place. However, when the airbag deploys inadequately, the occupant may be injured.

Thus, it is necessary to accurately detect the position (in particular, the head position) and posture of the occupant.

As one example of the related art of the disclosure, a technology of detecting the build and face position of an occupant, and deploying an airbag based on the result of the detection is known. According to the related art, the build and face position of the occupant can be detected, but it is difficult to accurately obtain the position of the head of the occupant, from the build of the occupant.

The occupant position detection system according to this embodiment calculates a first position of an occupant, using images captured by cameras, and calculates a second position of the occupant, using the results of detection of seat sensors. The occupant position detection system fuses the first position and the second position, to calculate an occupant position, and outputs information on the calculated occupant position, to a safety device, such as an airbag. Thus, according to this embodiment, the position of the occupant can be detected with high accuracy.

System Configuration of Occupant Position Detection System

The system configuration of the occupant position detection system according to this embodiment will be described. FIG. 1 shows the system configuration of the occupant position detection system according to this embodiment. As shown in FIG. 1, three cameras 10a, 10b, 10c (which will be generally called "cameras 10" when appropriate) for capturing images of an occupant seated on a seat are provided in the interior of the vehicle.

The seat is provided with a plurality of seat sensors 20. The seat sensors 20 include pressure sensors for detecting a load of the occupant, and position sensors for detecting the position of the seat. Although not illustrated in the drawings, a proximity sensor that measures a distance between a head rest and the head is also provided.

A controller 30 that detects the position of the head of the occupant is provided in the vehicle. The controller 30 is connected to the cameras 10 and the seat sensors 20. The controller 30 receives images of the occupant captured by the cameras 10, and the results of detection of the seat sensors 20. While the case where the controller 30 receives images captured by the camera 10c is shown in FIG. 1, for the purpose of illustration, the controller 30 also receives images captured by the camera 10a and camera 10b.

The controller 30 has a position detecting unit 31, position detecting unit 32, head position detecting unit 33, and output unit 34. Also, a storage unit 40 is connected to the controller 30. The storage unit 40 is a storage device in the form of a non-volatile memory, or a hard disk, or the like.

Actually, programs corresponding to the position detecting unit 31, position detecting unit 32, head position detecting unit 33, and output unit 34 are stored in the storage unit 40, and these programs are loaded into a memory and executed by a central processing unit (CPU), so that corresponding processes are implemented.

The position detecting unit 31 detects the first position of the occupant, based on the images captured by the cameras 10. More specifically, when a neural network included in the position detecting unit 31 receives images captured by the cameras 10, the neural network detects an occupant from the images, and outputs position of landmarks and body skeleton of the occupant and a seat position, while classifying the occupant by age and size.

Then, the facial landmarks and body skeleton of the occupant and the seat position are transmitted to a triangulation model. The triangulation model outputs a head position, body position, and seat position. A fusion unit included in the position detecting unit 31 fuses the head position, body position, and seat position generated from the triangulation model, and outputs the first position. The position detecting unit 31 will be described in detail later.

The position detecting unit 32 detects the second position of the occupant based on the detection results of the seat sensors 20. More specifically, a knowledge-based expert system included in the position detecting unit 32 receives the detection results of the seat sensors 20. In the knowledge-based expert system, an inference engine makes inferences, using the knowledge base. When the expert system receives the detection results of the seat sensors 20, it calculates a torso/body posture in two dimensions and a seat position in three dimensions, and outputs the second position based on the results of computation. The position detecting unit 32 will be described in detail later.

The head position detecting unit 33 fuses the first position calculated by the position detecting unit 31, and the second position calculated by the position detecting unit 32, to calculate the head position of the occupant. More specifically, the head position detecting unit 33 fuses the first position and the second position by a method called "minimum means square error (MMSE) method", and then calculates an estimated value of the head position of the occupant, by using the Kalman filter.

The output unit 34 outputs the head position of the occupant calculated by the head position detecting unit 33, to an airbag controller 50. The airbag controller 50 performs deployment control of the airbag, using the head position of the occupant received from the controller 30. The airbag controller 50 controls an airbag for front collision, airbag for rear collision, side impact airbag, and so forth.

While the controller 30 outputs the head position of the occupant to the airbag controller 50 in this embodiment, the disclosure is not limited to this. For example, when an airbag for front collision, airbag for rear collision, and side impact airbag are individually controlled, the controller 30 outputs the head position of the occupant to a controller of each of the airbags. Also, information on the head position of the occupant may be transmitted to a controller of a seat mounted airbag, controller of the head rest, controller of a seat belt, controller of a retractor, controller of a seat recliner, or an informing unit that provides guidance by voice or visually, as other examples of safety devices.

Thus, the occupant position detection system according to this embodiment is configured to fuse the first position of the occupant based on the images captured by the cameras 10, and the second position of the occupant based on the detection results of the seat sensors 20, to calculate the head position of the occupant, so that the head position of the occupant can be accurately detected.

Figure 2A:
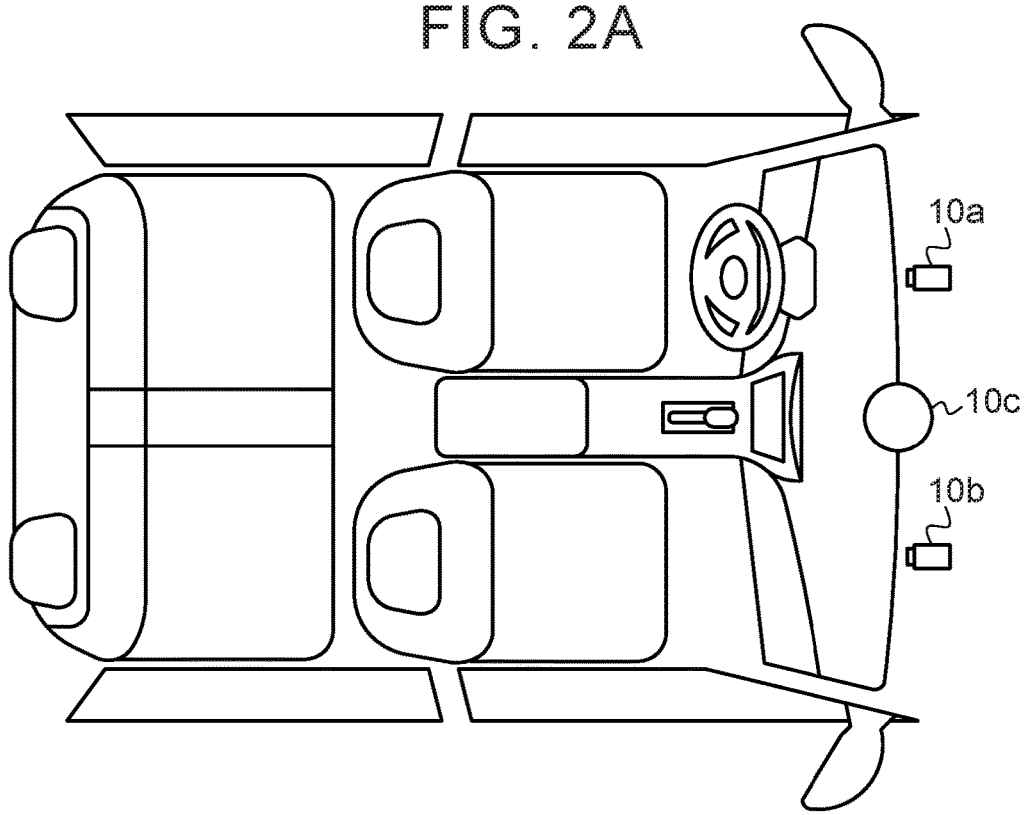
FIG. 2A is a view of the interior of a vehicle as viewed from above.
Figure 2B:
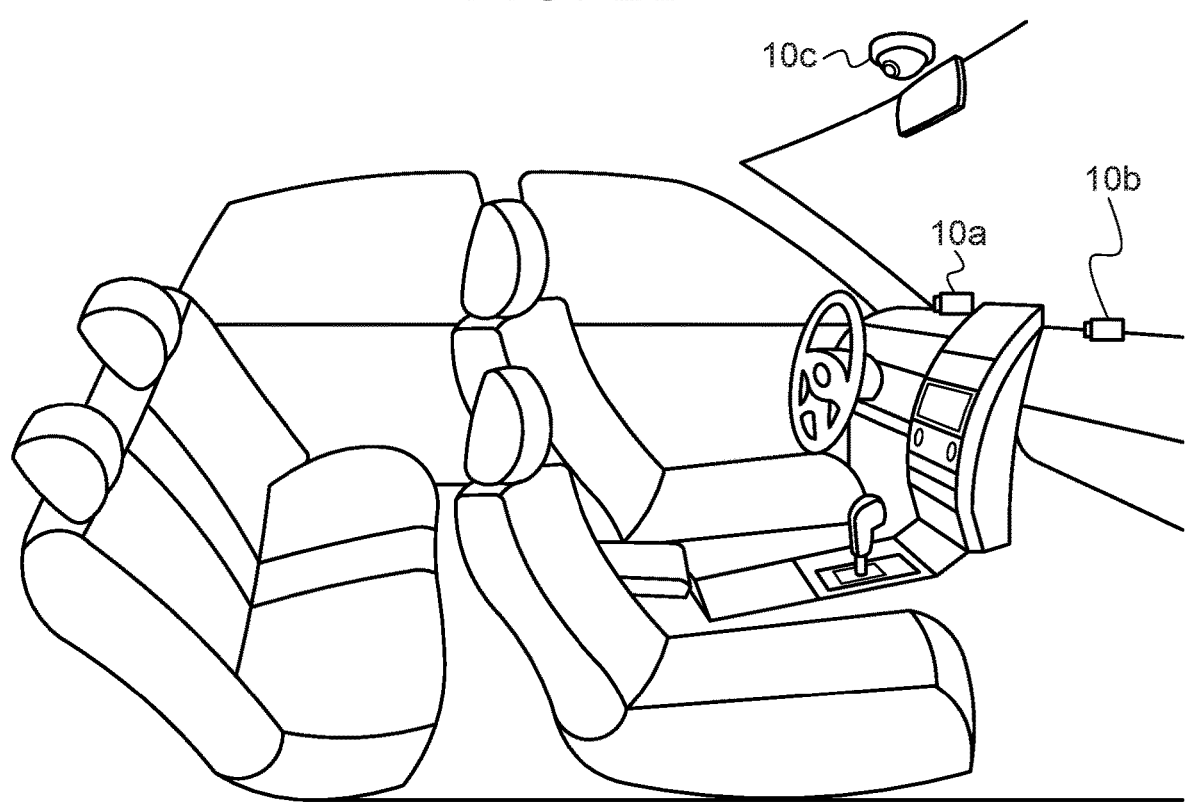
FIG. 2B is a view of the interior of the vehicle as viewed from one side thereof.

The cameras 10 provided in the vehicle will be described. FIG. 2A shows the interior of the vehicle as viewed from above. FIG. 2B shows the interior of the vehicle as viewed from one side thereof.

As shown in FIG. 2A and FIG. 2B, the cameras 10a, 10b, 10c that capture images of an occupant are provided in the interior of the vehicle. The cameras 10a, 10b, 10c use charge-coupled devices (CCDs), etc. for imaging the occupant seated on the driver's seat or passenger's seat. For example, when the occupant is seated on the passenger's seat, each of the cameras 10 captures an image of the occupant, and outputs the image of the occupant to the controller 30. The cameras 10 capture images of the occupant in the same timing.

Three cameras 10 are provided at different positions in the interior of the vehicle, so as to image the occupant from various different angles, and obtain a plurality of images having different imaging directions. While three cameras 10a, 10b, 10c are provided in this embodiment, the disclosure is not limited to this, but may be applied to the case where two cameras, or four or more cameras, are provided.

Configuration of Position Detecting Unit 31

The configuration of the position detecting unit 31 shown in FIG. 1 will be described. FIG. 3 is a functional block diagram showing the configuration of the position detecting unit 31 shown in FIG. 1. The position detecting unit 31 shown in FIG. 3 detects the position of the occupant, using the images captured by the cameras 10.

The position detecting unit 31 shown in FIG. 3 has a neural-network model 31a, triangulation model 31b, and fusion unit 31c.

The neural-network model 31a is one type of model that receives a plurality of input values and calculates an output value based on the input values, and is formed by connecting neurons in layers, using a neuron model that simulates brain cells.

The neural-network model 31a includes an occupant detector that detects an occupant, two-dimensional facial landmark detector that detects facial landmarks or feature points of the face in two dimensions, two-dimensional body skeleton detector that detects the skeleton of the body in two dimensions, two-dimensional seat position detector that detects a seat position in two dimensions, and age and size classifier. When the neural-network model 31a receives images, it outputs the position of the feature points of the occupant's face, skeleton of the occupant's body, and seat position.

The triangulation model 31b includes a triangulation unit that obtains a distance according to a triangulation algorithm, head position detector that detects a head position in three dimensions, body position detector that detects a body position in three dimensions, and seat position detector that detects a seat position in three dimensions. When the triangulation model 31b receives the feature points of the occupant's face, skeleton of the occupant's body, and seat position from the neural-network model 31a, the triangulation model 31b outputs the head position in three dimensions, body position in three dimensions, and seat position in three dimensions.

When the fusion unit 31c receives the head position in three dimensions, body position in three dimensions, and seat position in three dimensions, it outputs the body position in three dimensions, according to a fusion algorithm. The body position in three dimensions includes the head position.

Configuration of Position Detecting Unit 32

Figure 4:
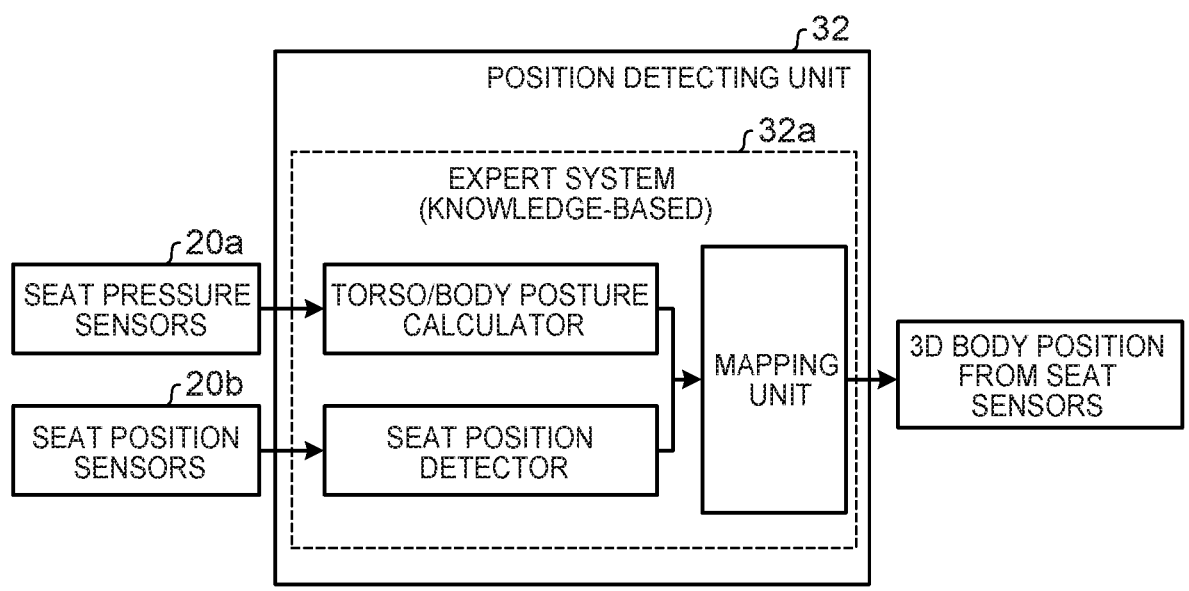
FIG. 4 is a functional block diagram showing the configuration of a position detecting unit that detects a position based on detection results of seat sensors shown in FIG. 1.

The position detecting unit 32 shown in FIG. 1 will be described. FIG. 4 is a functional block diagram showing the configuration of the position detecting unit 32 shown in FIG. 1. The position detecting unit 32 shown in FIG. 4 detects the position of the occupant, using the detection results of the seat sensors 20 (seat pressure sensor 20a and seat position sensor 20b).

The position detecting unit 32 shown in FIG. 4 has a knowledge-based expert system in which an inference engine makes inferences using the knowledge base. The expert system 32a has a torso/body posture calculator, seat position detector, and mapping unit. When the expert system 32a receives the detection results of the seat pressure sensors and the detection results of the seat position sensors, it calculates the torso/body posture in two dimensions, and the seat position in three dimensions, and outputs the second position (body position in three dimensions) based on the results of calculation. The second position includes the head position of the occupant.

Figure 5:
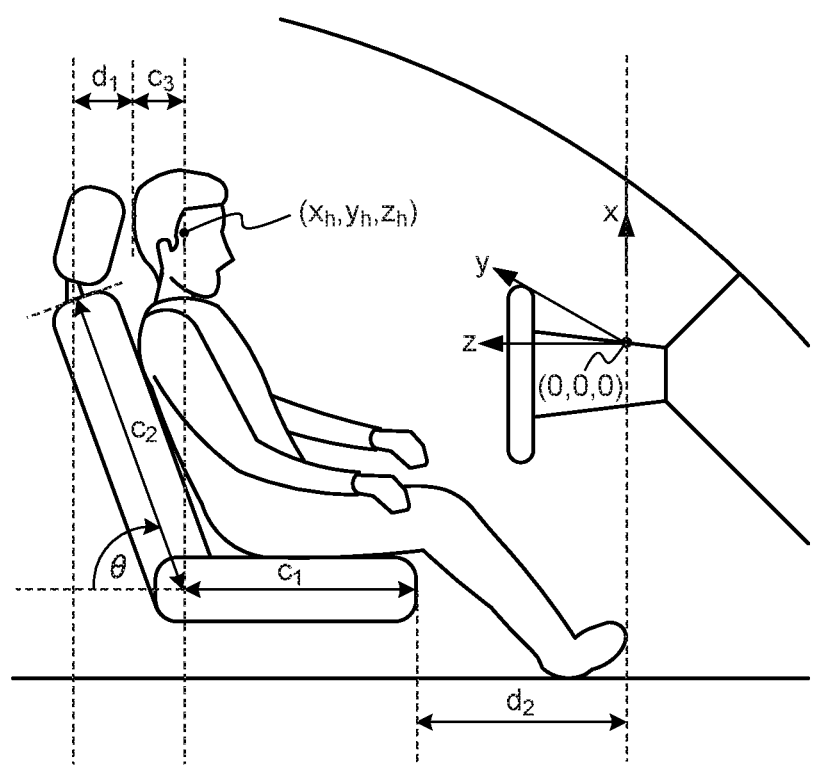
FIG. 5 is a view useful for describing a mathematical model for obtaining a head position of an occupant from detection results of the seat sensors.

Here, a mathematical model for obtaining the head position of the occupant from the detection results of the seat sensors 20 will be described. FIG. 5 is a view useful for describing the mathematical model for obtaining the head position of the occupant from the detection results of the seat sensors 20. FIG. 5 shows the case where proximity sensors are also used.

The distance $Z_h$ from the origin (0, 0, 0) shown in FIG. 5 to a center point of the head at time h is calculated according to the following equation.

$$Z_h = d_2 + c_1 + c_2 \cdot \cos \theta - d_1 - c_3$$

In this equation, $d_2$ and $\theta$ are output values of the seat position sensors obtained when the seat position is changed, $d_1$ is an output value of the distance between the head rest and the head generated from the proximity sensor, $c_1$ and $c_2$ are constants indicating seat properties, and $c_3$ is a distance from the back of the head to the center of the head. While $c_3$ is a parameter that changes depending on the occupant, it is supposed to be a constant value.

If $d_2$ and $\theta$ generated from the seat position sensors, and $d_1$ generated from the proximity sensor are obtained when the seat position is changed, the distance $Z_h$ from the origin (0, 0, 0) to the center point of the head at time h can be easily obtained.

Configuration of Head Position Detecting Unit 33

Figure 6:
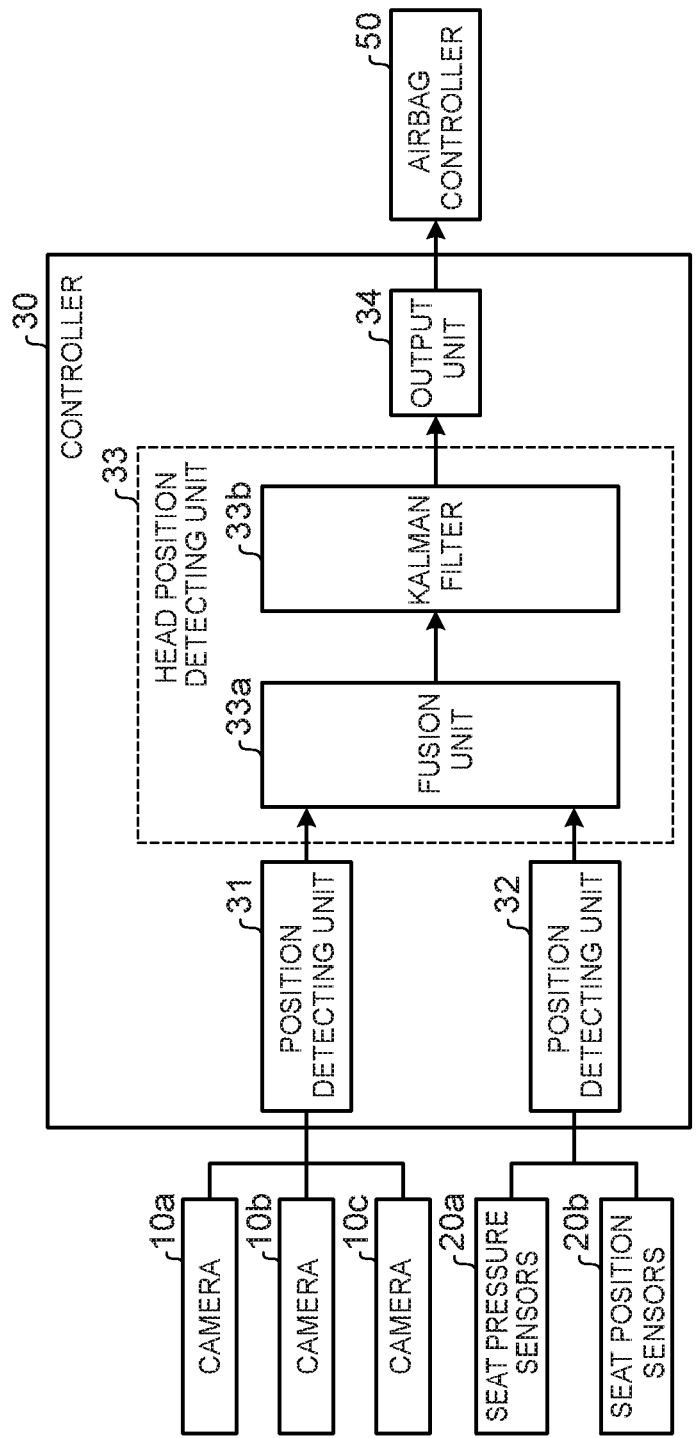
FIG. 6 is a functional block diagram showing the configuration of a head position detecting unit shown in FIG. 1.

The configuration of the head position detecting unit 33 shown in FIG. 1 will be described. FIG. 6 is a functional block diagram showing the configuration of the head position detecting unit 33 shown in FIG. 1. The head position detecting unit 33 shown in FIG. 6 calculates the head position of the occupant, by fusing the first position generated from the position detecting unit 31, and the second position generated from the position detecting unit 32, and outputs the head position of the occupant to the airbag controller 50, via the output unit 34.

As shown in FIG. 6, the head position detecting unit 33 has a fusion unit 33a that fuses the first position and the second position, using the minimum means square error (MMSE) method, and a Kalman filter 33b used for estimating amounts (e.g., the position and velocity of a certain object) that vary with time, from measurements containing discrete errors.

Figure 7:
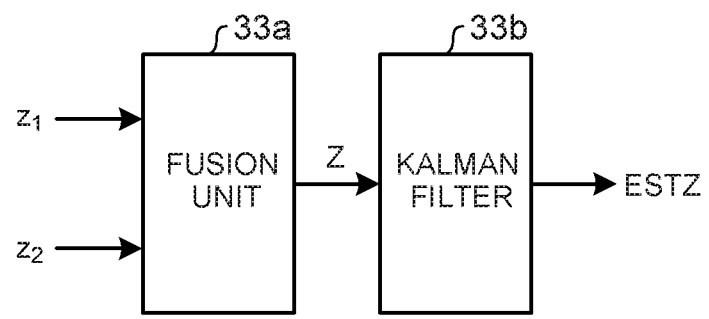
FIG. 7 is a view useful for describing the input and output of the head position detecting unit.

FIG. 7 is a view useful for describing the input and output of the head position detecting unit 33. In FIG. 7, only the z direction, out of the coordinates (x, y, z) of the head position, is illustrated. As shown in FIG. 7, when the fusion unit 33a receives a first head position $z_1$ and a second head position $z_2$, the fusion unit 33a fuses the first head position $z_1$ and the second head position $z_2$ by the minimum means square error (MMSE) method, and outputs the head position Z. The minimum means square error method will be described in detail later. Then, when the Kalman filter 33b receives the head position Z, it outputs an estimated value ESTZ of the z direction.

Processing Procedure of Head Position Detecting Unit 33

Figure 8:
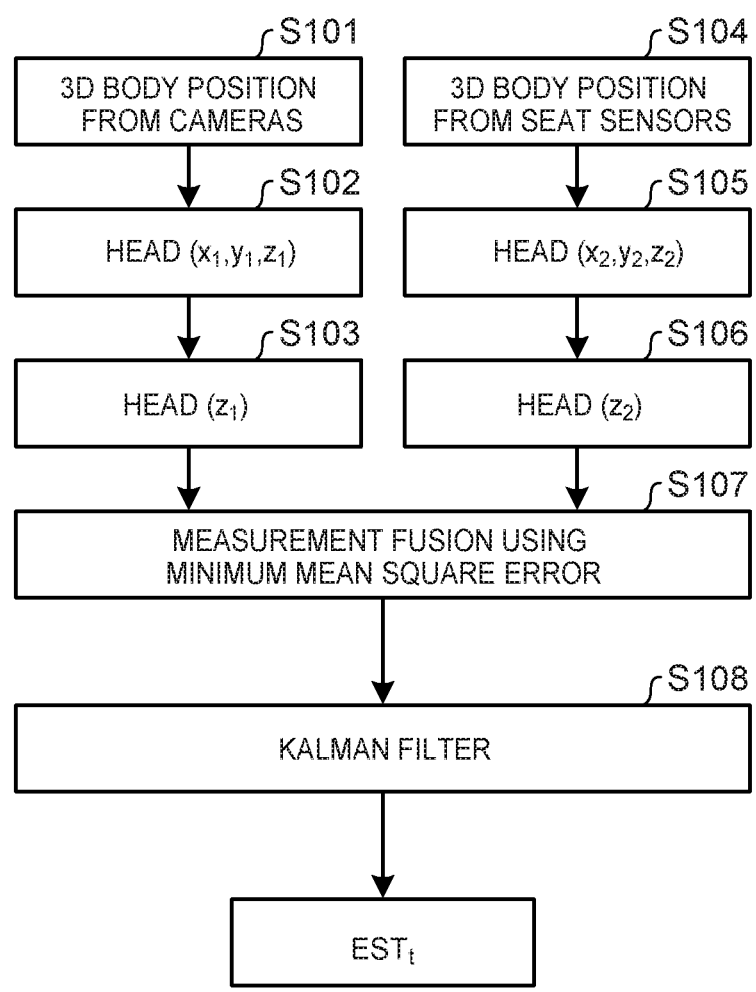
FIG. 8 is a sequence diagram showing the processing procedure of the head position detecting unit.

A processing procedure of the head position detecting unit 33 will be described. FIG. 8 is a sequence diagram showing the processing procedure of the head position detecting unit 33. Referring to FIG. 8, the case where the value of the z coordinate of the head position is obtained will be described.

As shown in FIG. 8, when the head position detecting unit 33 receives the three-dimensional body position from the position detecting unit 31 (step S101), it specifies the head position Head ($x_1$, $y_1$, $z_1$) (step S102), and extracts Head ($z_1$) as the z coordinate of the head position (step S103). Similarly, when the head position detecting unit 33 receives the three-dimensional body position from the position detecting unit 32 (step S104), it specifies the head position Head ($x_2$, $y_2$, $z_2$) (step S105), and extracts Head ($z_2$) as the z coordinate of the head position (step S106).

Then, the fusion unit 33a of the head position detecting unit 33 receives Head ($z_1$) and Head ($z_2$) (step S107). The fusion unit 33a fuses Head ($z_1$) and Head ($z_2$), using a method called "minimum means square error (MMSE) method", to output Head (Z) as the head position resulting from the fusion. Then, the Kalman filter 33b of the head position detecting unit 33 receives Head (Z), and outputs $EST_t$ as an estimated value in the z direction (step S108).

Description of the Minimum Means Square Error (MMSE) Method

The minimum means square error (MMSE) method performed by the fusion unit 33a will be described. Measurements $Z_1$, $Z_2$ of random variables are expressed as follows: $Z_1=a_1 \cdot z+e_1$, $Z_2=a_2 \cdot z+e_2$, where z (random variable) as an input value is a known value of expectation 0, and variance $\sigma_z^2$, and $a_1$ and $a_2$ are known coefficients. Also, $e_1$ and $e_2$ are random variables representing input errors (noise), and are known values of which the average is 0, and variances are $\sigma_1^2$, $\sigma_2^2$, respectively. The expectations of the two measurements $Z_1$, $Z_2$ are supposed to be "0".

In this case, the two measurements $Z_1$, $Z_2$ can be fused into a single value Z in the form of linear combination, by the minimum means square method. $Z=\omega_1 \cdot Z_1+\omega_2 \cdot Z_2$, where $\omega_i$ (i=1, 2) are obtained as follows: $\omega_1=(a_i/\sigma_i^2)/\{\Sigma_i(a_i^2/\sigma_i^2)+1/\sigma_z^2\}$.

Description of Kalman Filter

Figure 9:
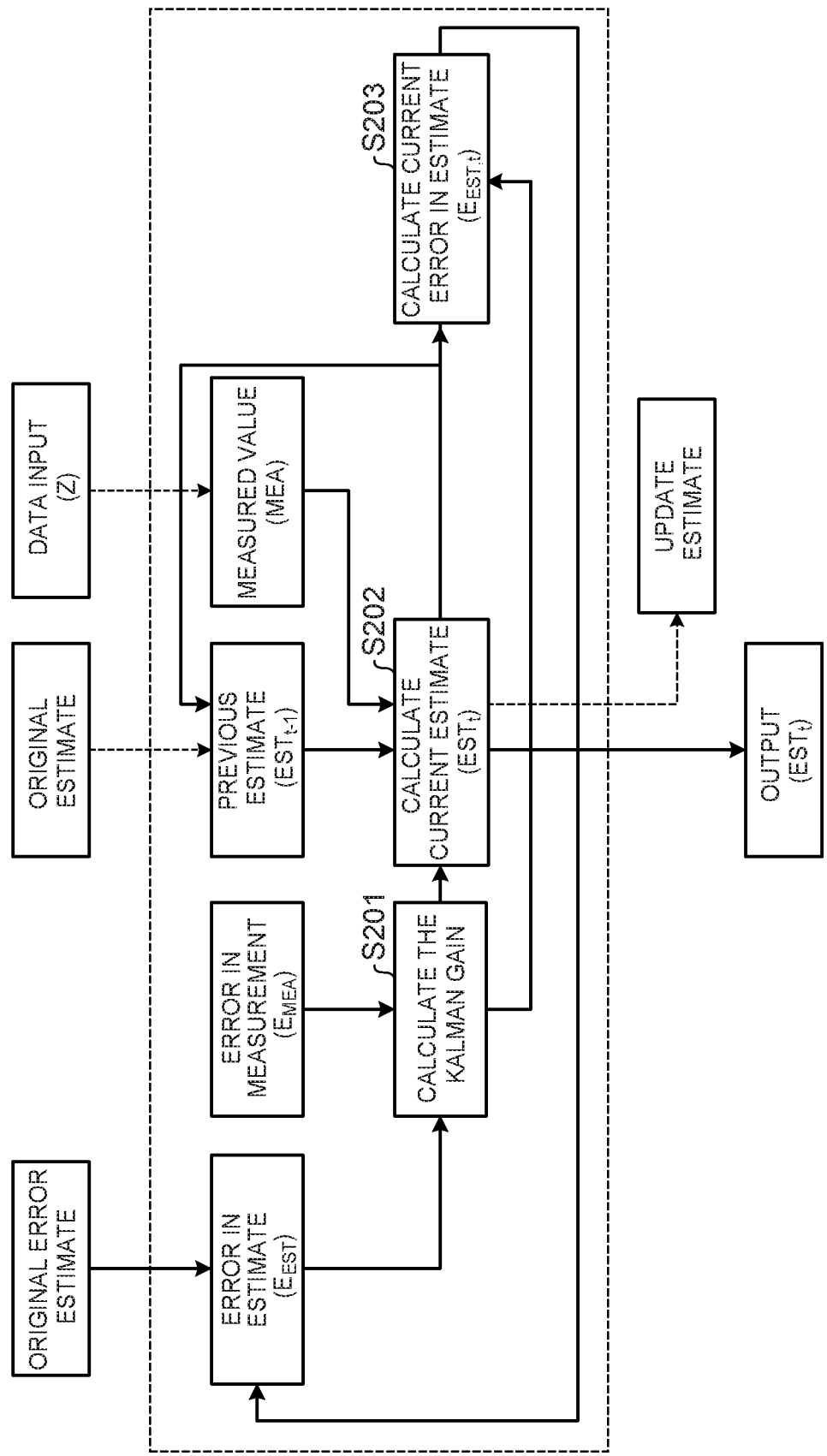
FIG. 9 is a view useful for describing the Kalman filter.

The Kalman filter 33b will be described. FIG. 9 is a view useful for describing the Kalman filter 33b. Referring to FIG. 9, the case where the Kalman filter 33b receives Z from the fusion unit 33a, and outputs the estimate $EST_t$ will be described.

The Kalman filter 33b performs three calculations as follows: (1) calculation of the Kalman gain, (2) calculation of an estimate, and (3) calculation of a new error in the estimate (variance).

The calculation of the Kalman gain as mentioned above at (1) will be described. As shown in FIG. 9, the Kalman gain KG is obtained according to the following equation: $KG=E_{EST}/(E_{EST}+E_{MEA})$, where KG is the Kalman gain, $E_{EST}$ is an error (variance) in the estimate, and $E_{MEA}$ is an error (variance) in the measurement (step S201). Here, $0 \leq KG \leq 1$.

The calculation of the estimate as mentioned above at (2) will be described. As shown in FIG. 9, the current estimate $EST_t$ is obtained according to the following equation: $EST_t=EST_{t-1}+KG[MEA-EST_{t-1}]$, where MEA is the measurement, $EST_t$ is the current estimate, and $EST_{t-1}$ is the previous estimate (step S202).

The calculation of the estimate error as mentioned above at (3) will be described. The new error in the estimate $E_{EST,t}$ is obtained according to the following equation: $E_{EST,t}=(E_{MEA})(E_{EST,t-1})/[(E_{MEA})+(E_{EST,t-1})]=[1-KG](E_{EST,t-1})$ (step S203). In this manner, the estimate error $E_{EST,t}$ at time t can be sequentially obtained. Thus, the Kalman gain (KG) can also be sequentially updated.

Figure 10:
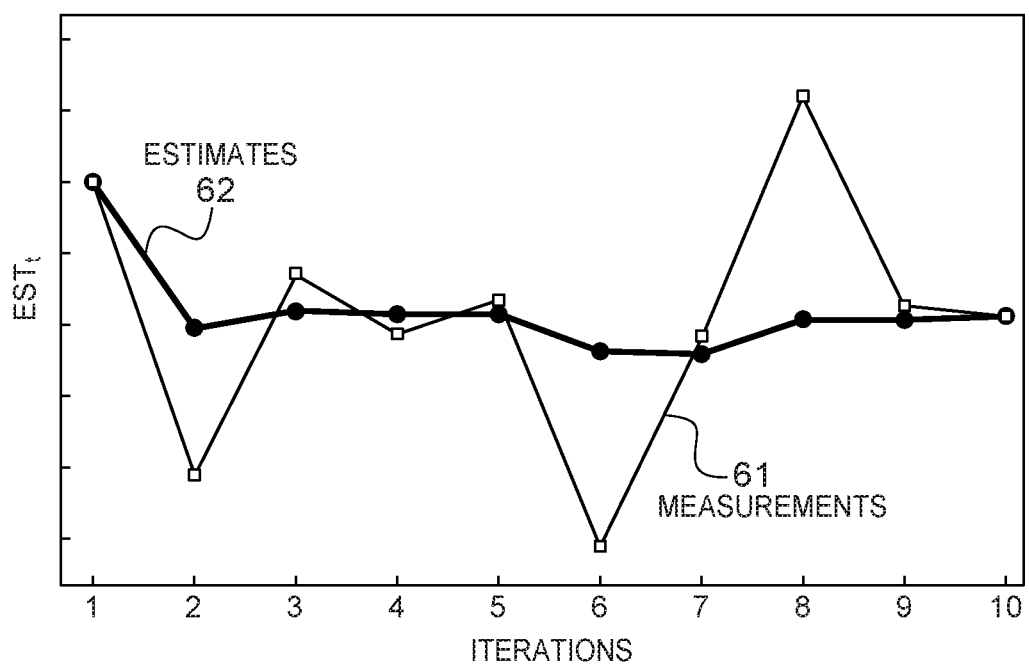
FIG. 10 is a view showing one example of an effect obtained when the Kalman filter is used.

Thus, when the Kalman filter is applied to measurements, highly accurate estimation can be performed through sequential updating, even if the initial value is a random value. For example, when a curve 61 of measurements as shown in FIG. 10 is obtained, a curve 62 of estimates can be obtained by applying the Kalman filter to the measurements. Generally, the curve 62 of estimates conforms to true values.

As described above, the occupant position detection system according to this embodiment includes the cameras 10, seat sensors 20, two position detecting units 31, 32, head position detecting unit 33, and output unit 34. The cameras 10 capture images of an occupant seated on a seat provided in the interior of the vehicle. The seat sensors 20 detect the position of the seat. The position detecting unit 31 calculates the first position of the occupant from the images captured by the cameras 10. The position detecting unit 32 calculates the second position of the occupant from the detection results of the seat sensors 20. The head position detecting unit 33 calculates the occupant position by fusing the first position and the second position. The output unit 34 outputs information on the head position of the occupant calculated by the head position detecting unit 33, to the airbag controller 50. Thus, the occupant position detection system can detect the head position of the occupant with high accuracy.

The neural-network model 31a of the position detecting unit 31 receives images captured by the cameras 10. When the facial landmarks and body skeleton of the occupant and the seat position are generated from the neural-network model 31a, the triangulation model 31b of the position detecting unit 31 receives these items of information. When the head position, body position, and seat position are generated from the triangulation model 31b, the fusion unit 31c of the position detecting unit 31 fuses these items of information, and outputs the first position. Thus, the position detecting unit 31 can output an adequate head position from the images.

The knowledge-based expert system 32a of the position detecting unit 32 receives detection results obtained by the seat sensors 20. The expert system 32a calculates the torso/body posture in two dimensions, and calculates the seat position in three dimensions. The position detecting unit 32 outputs the second position, based on calculation results of the expert system 32a. Thus, the position detecting unit 32 can output an adequate position of the head of the occupant from the detection results of the seat sensors 20.

Figure 11:
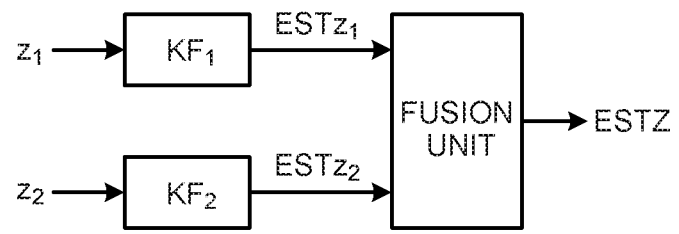
FIG. 11 is a view useful for describing the input and output of ahead position detecting unit according to a modified example.

The head position detecting unit 33 calculates the position by fusing the first position and the second position, by linear combination using the minimum means square error (MMSE) method. The head position detecting unit 33 calculates the occupant position by applying the Kalman filter to the result of calculation. Thus, the head position detecting unit 33 can output an adequate head position Modified Examples Next, a modified example of the occupant position detection system according to this embodiment will be described. FIG. 11 is a view useful for describing the input and output of a head position detecting unit according to the modified example. In FIG. 11, only the z direction, out of the coordinates (x, y, z) of the head position, is illustrated. As shown in FIG. 11, the Kalman filter $K_{F1}$ receives the first head position $z_1$, and calculates an estimate $ESTz_1$. Similarly, the Kalman filter $KF_2$ receives the second head position $z_2$, and calculates an estimate $ESTz_2$. Then, the fusion unit receives the estimate $ESTz_1$ and the estimate $ESTz_2$, and fuses the estimate $ESTz_1$ and the estimate $ESTz_2$ by the minimum means square error (MMSE) method, so as to output an estimate ESTZ of the head position. Thus, the Kalman filter can be applied to the head positions $z_1$ and $z_2$ as measurements, before the fusion unit performs fusion.

Figure 12:
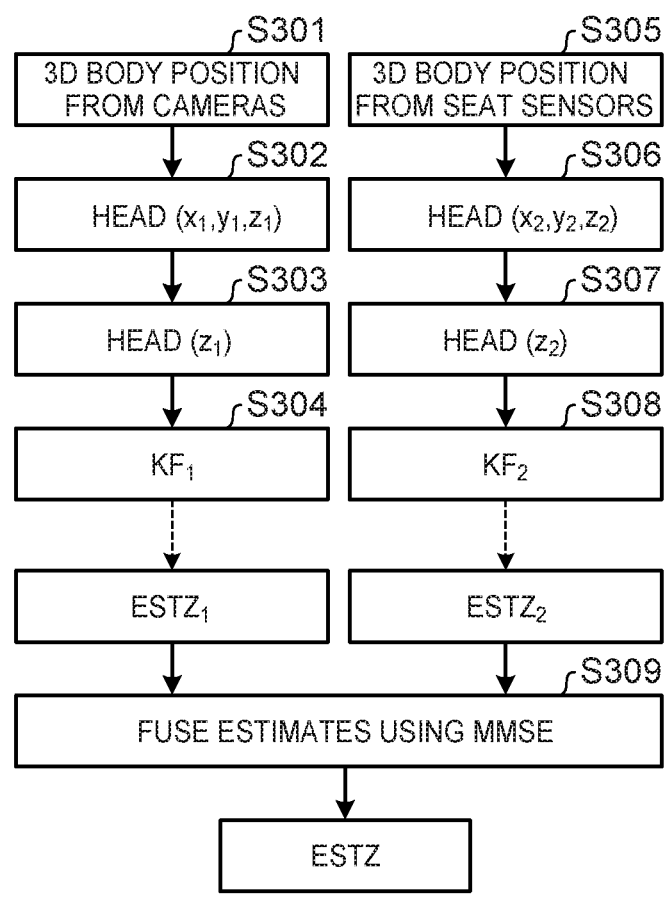
FIG. 12 is a sequence diagram showing the processing procedure of the head position detecting unit according to the modified example.

FIG. 12 is a sequence diagram showing the processing procedure of the head position detecting unit according to the modified example. As shown in FIG. 12, when the head position detecting unit receives the three-dimensional body position from the position detecting unit 31 (step S301), it specifies the head position Head ($x_1, y_1, z_1$) (step S302), and extracts Head ($z_1$) as the z coordinate of the head position (step S303). Then, the head position detecting unit applies the Kalman filter $KF_i$ to Head ($z_1$), so as to obtain the estimate $ESTZ_1$ (step S304).

Similarly, when the head position detecting unit receives the three-dimensional body position from the position detecting unit 32 (step S305), it specifies the head position Head ($x_2, y_2, z_2$) (step S306), and extracts Head ($z_2$) as the z coordinate of the head position (step S307). Then, the head position detecting unit applies the Kalman filter $KF_2$ to Head ($z_2$), so as to obtain the estimate $ESTZ_2$ (step S308).

Then, the fusion unit of the head position detecting unit receives the estimates $ESTZ_1$ and $ESTZ_2$. The fusion unit fuses the estimates $ESTZ_i$ and $ESTZ_2$, using the minimum means square error (MMSE) method, and outputs the estimate ESTZ of the head position (step 309).

While each configuration is schematically illustrated in terms of functions in the above embodiment, it is not necessarily required to be physically constructed as illustrated. Namely, the form of distribution and integration of respective devices is not limited to the illustrated one, but all or a part of the devices may be functionally or physically distributed or integrated in desired units, depending on various load and usage conditions.

The occupant position detection system according to this embodiment is useful for detecting the position of the occupant with high accuracy.

What is claimed is:

1. An occupant position detection system, comprising:
   an imaging device configured to capture an image of an occupant seated on a seat provided in an interior of a vehicle;
   a sensor provided on the seat; and
   a central processing unit configured to:
   calculate a first position which includes a first head position of the occupant from the image captured by the imaging device;
   calculate a second position which includes a second head position of the occupant from a detection result of the sensor;
   calculate an occupant position by fusing the first position and the second position; and
   output information on the occupant position to a safety device,
   wherein the central processing unit includes:
   a neural network that receives the image captured by the imaging device, and outputs information about facial landmarks and a body skeleton of the occupant and a first seat position in two dimensions;
   a triangulation model that receives information about the facial landmarks and the body skeleton of the occupant and the first seat position from the neural network, and generates the first head position in three dimensions, the body position in three dimensions and the first seat position in three dimensions, and
   a fusion unit including a fusion algorithm that fuses the first head position, the body position, and the first seat position generated by the triangulation model, so as to output the first position including the body position of the occupant in three dimensions which includes the first head position in three dimensions.

2. The occupant position detection system according to claim 1, wherein the central processing unit is configured to calculate a position by fusing the first position and the second position, by linear combination using a minimum mean square error method, and calculate the occupant position by applying a Kalman filter to the position calculated by fusing the first positon and the second position, by linear combination using a minimum mean square error method.

3. The occupant position detection system according to claim 1, wherein the central processing unit is configured to: calculate a torso/body posture in two dimensions, calculate a second seat position in three dimensions, and output the second position based on the calculated torso/body posture in two dimensions and the calculated seat position in three dimensions.

4. The occupant position detection system according to claim 1, wherein the safety device comprises at least one of a first airbag for front collision, a second airbag for rear collision, a side impact airbag, a seat mounted airbag, a head rest, a retractor, or a seat recliner.

5. The occupant position detection system according to claim 4, wherein the safety device is configured to provide guidance by voice or visually.

* * * * *